United States Patent
Chen

(10) Patent No.: US 8,364,873 B2
(45) Date of Patent: Jan. 29, 2013

(54) DATA TRANSMISSION SYSTEM AND A PROGRAMMABLE SPI CONTROLLER

(75) Inventor: Chi-Ming Chen, Yilan County (TW)

(73) Assignee: Nuvoton Technology Corporation, Hsinchu Science Park (TW)

(*) Notice: Subject to any disclaimer, the term of this patent is extended or adjusted under 35 U.S.C. 154(b) by 199 days.

(21) Appl. No.: 13/033,106

(22) Filed: Feb. 23, 2011

(65) Prior Publication Data

US 2011/0225339 A1    Sep. 15, 2011

(30) Foreign Application Priority Data

Mar. 9, 2010   (TW) .............................. 99106718 A

(51) Int. Cl.
*G06F 3/00* (2006.01)
*G06F 13/40* (2006.01)
*G06F 13/14* (2006.01)

(52) U.S. Cl. ................ 710/110; 710/8; 710/10; 710/14; 710/104; 710/105

(58) Field of Classification Search .................... 710/110
See application file for complete search history.

(56) References Cited

U.S. PATENT DOCUMENTS

| | | | |
|---|---|---|---|
| 7,533,106 B2 | 5/2009 | Magdeburger et al. | |
| 7,558,900 B2* | 7/2009 | Jigour et al. ................. | 710/305 |
| 7,765,269 B2* | 7/2010 | Kanekawa et al. ........... | 709/208 |
| 8,086,761 B2* | 12/2011 | Huang et al. ..................... | 710/10 |
| 8,156,274 B2* | 4/2012 | Kapelner ....................... | 710/110 |
| 8,195,857 B2* | 6/2012 | Barrenscheen ............... | 710/110 |
| 8,237,683 B2* | 8/2012 | Yeh et al. ....................... | 345/174 |
| 2002/0188782 A1* | 12/2002 | Fay ................................. | 710/110 |
| 2007/0143512 A1* | 6/2007 | Kuo .................................. | 710/110 |
| 2008/0005434 A1* | 1/2008 | Lee et al. ........................ | 710/110 |
| 2008/0165589 A1 | 7/2008 | Hung et al. | |
| 2009/0063736 A1* | 3/2009 | Wilson et al. ................... | 710/61 |
| 2009/0138626 A1 | 5/2009 | Le et al. | |
| 2009/0193165 A1* | 7/2009 | Hsieh et al. .................... | 710/110 |
| 2011/0153915 A1* | 6/2011 | Zitlaw ............................ | 711/103 |
| 2012/0089754 A1* | 4/2012 | Su et al. ........................... | 710/56 |
| 2012/0131247 A1* | 5/2012 | Mok .............................. | 710/110 |
| 2012/0166695 A1* | 6/2012 | Venus et al. .................. | 710/110 |

* cited by examiner

*Primary Examiner* — Ryan Stiglic
(74) *Attorney, Agent, or Firm* — Muncy, Geissler, Olds & Lowe, PLLC

(57) ABSTRACT

A data transmission system is provided. The data transmission system includes a serial peripheral interface (SPI) and a programmable controller. The SPI is coupled between a first device and at least one second device. The programmable controller controls the SPI to switch between a single port data transmission mode and a multi-port data transmission mode. When there are more than one second device coupled to the SPI, the SPI is switched to the multi-port data transmission mode so as to perform multi-port data transmission between the first device and the second devices. At this time, the first device concurrently transmits data to each of the second devices via a first transmission bus terminal, and concurrently receives data from each of the second devices via a second transmission bus terminal.

16 Claims, 6 Drawing Sheets

DATA TRANSMISSION SYSTEM AND A PROGRAMMABLE SPI CONTROLLER

CROSS REFERENCE TO RELATED APPLICATIONS

This Application claims priority of Taiwan Patent Application No. 099106718, filed on Mar. 9, 2010, the entirety of which is incorporated by reference herein.

BACKGROUND OF THE INVENTION

1. Field of the Invention

The invention relates to a data transmission system, and more particularly to a data transmission system capable of providing programmable multi-port data transmission functionality via a Serial Peripheral Interface (SPI).

2. Description of the Related Art

Serial Peripheral Interface (SPI) is a synchronous serial data link standard using four wires for data transmission in a master/slave structure, and is one popular communication interface for data transmission between devices.

However, due to structural limitations, the current SPI is restricted to perform data transmission between a single master device and a single slave device. That is, a single port Master Output Slave Input (MOSI) data transmission or a single port Master Input Slave Output (MISO) data transmission is performed. With advancements in system applications, a single port data transmission utilizing an SPI can no longer fulfill increased system requirements; especially for systems that required immediately data processing in response to change of data content.

Therefore, an improved SPI, which is capable of providing multi-port data transmission functionality under an existing hardware structure and further providing programmable properties to flexibly switch between a single port or a multi-port data transmission is required, to comply with different system requirements under a fixed hardware structure.

BRIEF SUMMARY OF THE INVENTION

Data transmission systems and a programmable SPI controller are provided. An exemplary embodiment of a data transmission system comprises an SPI coupled between a first device and at least one second device and a programmable controller. The SPI comprises a serial clock terminal transmitting a clock signal between the first device and the at least one second device, a chip select terminal transmitting a chip select signal between the first device and the at least one second device so as to activate data transmission therebetween, a first transmission bus terminal transmitting data from the first device to the at least one second device, and a second transmission bus terminal transmitting data from the at least one second device to the first device. The programmable controller controls the SPI to switch between a single port data transmission mode and a multi-port data transmission mode. When there are more than one second device coupled to the SPI, the SPI is switched to the multi-port data transmission mode so as to perform multi-port data transmission between the first device and the second devices. At this time, the first device concurrently transmits data to each of the second devices via the first transmission bus terminal, and concurrently receives data from each of the second devices via the second transmission bus terminal.

Another exemplary embodiment of a data transmission system comprises an SPI coupled to a first device and a programmable controller. The SPI comprises a serial clock terminal transmitting a clock signal to at least one second device, a chip select terminal transmitting a chip select signal so as to activate data transmission, a first transmission bus terminal transmitting data to the at least one second device, and a second transmission bus terminal receiving data from the at least one second device. The programmable controller controls the SPI to switch between a single port data transmission mode and a multi-port data transmission mode. When there are more than one second device coupled to the SPI, the SPI is switched to the multi-port data transmission mode so as to perform multi-port data transmission between the first device and the second devices. At this time, the first device concurrently transmits data to each of the second devices via the first transmission bus terminal, and concurrently receives data from each of the second devices via the second transmission bus terminal.

Another exemplary embodiment of a programmable SPI controller for controlling a data transmission mode of an SPI comprises a data transmission selector dispatching data according to a port control parameter. The port control parameter represents a number of the at least one second device that concurrently transmit data with a first device. The data transmission mode is switched between a single port data transmission mode and a multi-port data transmission mode. The first device and the at least one second device transmit data bits via the SPI. When there are more than one second device coupled to the SPI, the SPI is switched to the multi-port data transmission mode so as to perform multi-port data transmission between the first device and the second devices. At this time, the first device concurrently transmits data to each of the second devices via a first transmission bus terminal, and concurrently receives data from each of the second devices via a second transmission bus terminal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
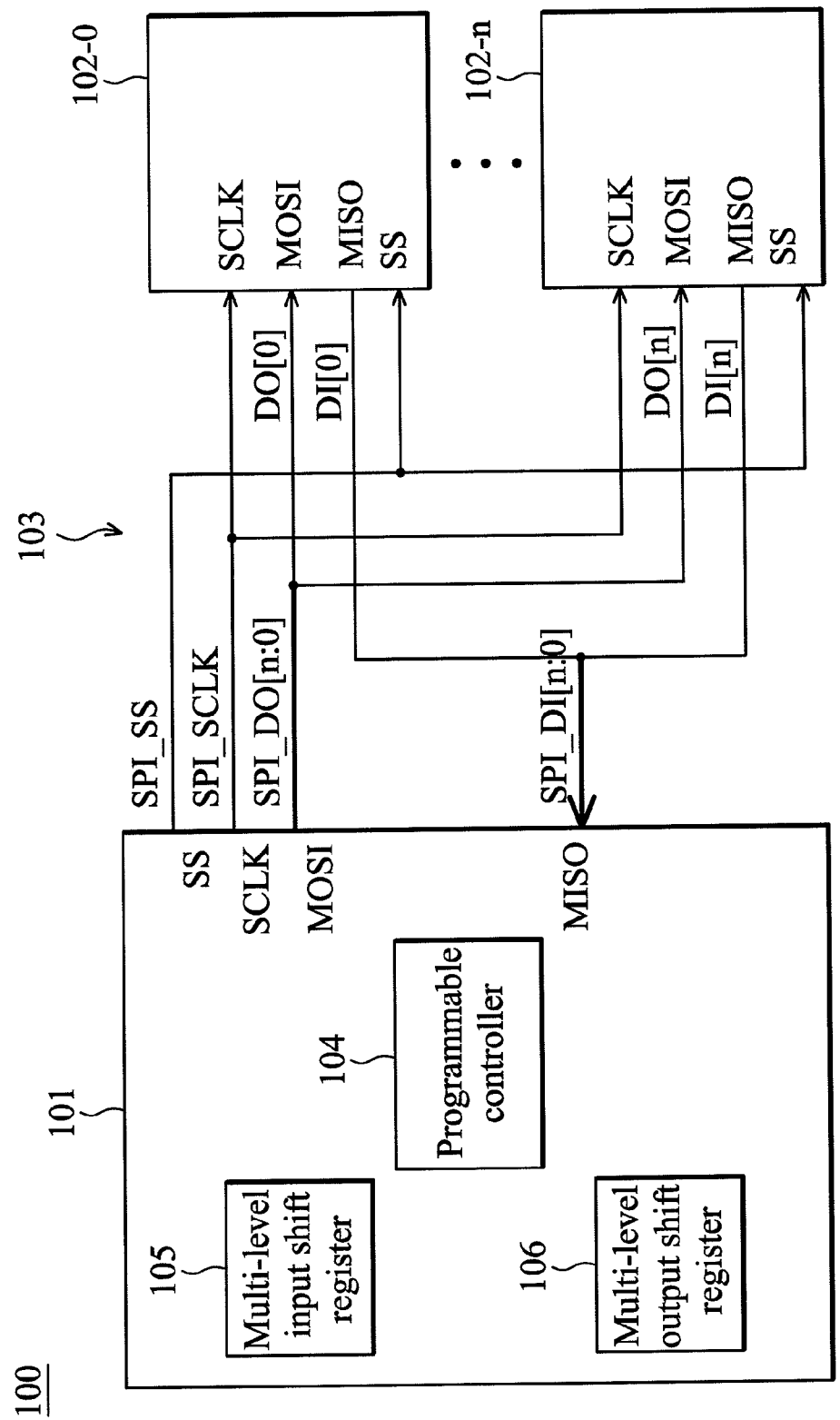
FIG. 1 shows a data transmission system according to an embodiment of the invention.

FIG. 1 shows a data transmission system 100 according to an embodiment of the invention. The data transmission system 100 comprises a plurality of data transmission devices 101 and 102-0 to 102-n, and a Serial Peripheral Interface (SPI) 103 coupled therebetween. The data transmission devices may comprise a master device (for example, 101) and at least one slave device (for example, 102-0 to 102-$n$, where $n$ is a positive integer). The SPI 103 comprises a serial clock terminal SCLK, a chip select terminal SS, and transmission bus terminals MOSI (Master Output Slave Input) and MISO (Master Input Slave Output), coupled between the data transmission devices. The master device 101 transmits a clock signal SPI_SCLK to the slave devices 102-0 to 102-$n$ via the serial clock terminal SCLK so as to provide the clock signal to the slave devices, and transmits a chip select signal SPI_SS to the slave devices 102-0 to 102-$n$ via the chip select terminal SS so as to activate data transmission therebetween.

According to an embodiment of the invention, the transmission bus MOSI[n:0] may be utilized for single bit or multi-bits data transmission from the master device to the slave device(s), such as the data bits SPI_DO[n:0] shown in FIG. 1, and the transmission bus MISO[n:0] may be utilized for single bit or multi-bits data transmission from the slave device(s) to the master device, such as the data bits SPI_DI[n:0] shown in FIG. 1. According to an embodiment of the invention, the clock signal SPI_SCLK and the chip select signal SPI_SS are shared between a plurality of slave devices. Therefore, when more than one slave device is selected, each slave device may transmit data to and receive data from the master device in both directions at the same time. That is, multiple data bits may be concurrently transmitted in a full duplex manner between the master and slave devices.

According to an embodiment of the invention, the data transmission system 100 may further comprise a programmable controller (or so-called programmable SPI controller) for controlling a data transmission mode of the SPI 103 in the data transmission system 100. The programmable controller may be independently configured in the data transmission system 100, or may be flexibly integrated inside of the master device 101 (as the programmable controller 104 shown in FIG. 1), the at least one of the slave devices or the SPI 103. Therefore, the hardware structure of the invention should not be limited to the one as shown in FIG. 1. According to an embodiment of the invention, the programmable controller may control the SPI 103 to switch between a single port data transmission mode and a multi-port data transmission mode according to various system requirements. When there are more than one slave device coupled to the SPI 103, the programmable controller may control the SPI 103 to switch to the multi-port data transmission mode in accordance with the system requirement so as to control multi-port data transmission between the master device and the slave devices. As previously described, at this time, data bits may be concurrently transmitted in both directions between the master device and the slave devices. The single port and multi-port data transmission modes will be introduced in more detail in the following descriptions.

Figure 2:
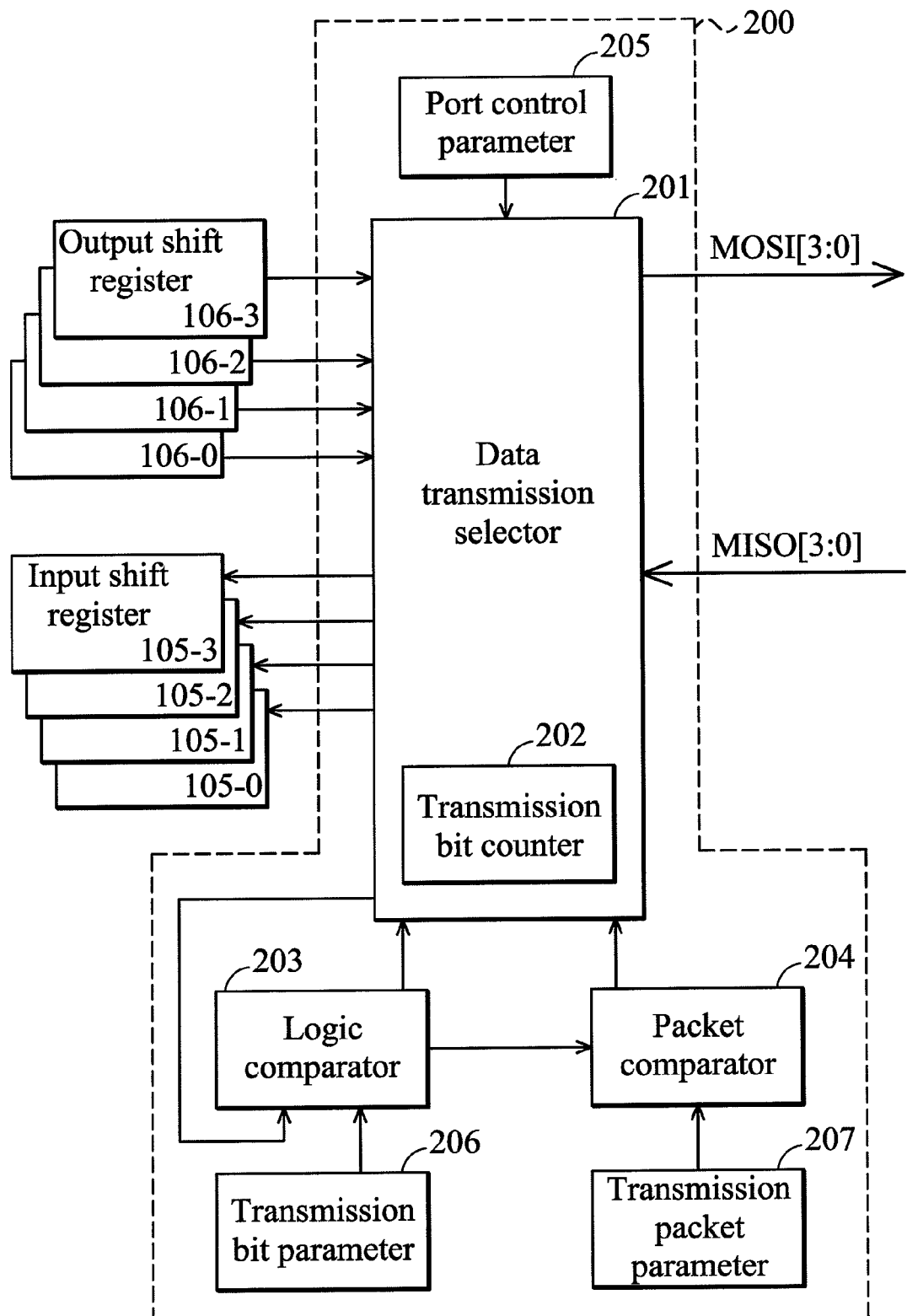
FIG. 2 is a block diagram showing a programmable controller according to an embodiment of the invention.

FIG. 2 is a block diagram showing a programmable controller according to an embodiment of the invention. As previously described, the programmable controller may be independently configured in the data transmission system, or may be flexibly integrated inside of the master device, the at least one of the slave devices or the SPI. Therefore, the hardware structure of the invention should not be limited to any specific hardware structure. As shown in FIG. 2, the programmable controller 200 may comprise a data transmission selector 201, a transmission bit counter 202, a logic comparator 203 and a packet comparator 204. The data transmission selector 201 dispatches data according to a port control parameter 205. The port control parameter 205 may be set to a number of the slave device(s) that can concurrently transmit data with the master device in the data transmission system. For example, when there are at most 4 slave devices that can be supported in the data transmission system to concurrently perform data transmission with the master device, the port control parameter 205 may be set to a positive integer ranged from 1 to 4. When the port control parameter 205 is set to 1, it means that the data transmission system is now in a single port data transmission mode. Therefore, only one slave device is supported to transmit data with the master device at the same time. In another aspect, when the port control parameter 205 is set to 4, it means that the data transmission system is now in a multi-port data transmission mode. Therefore, four slave devices at most can be supported to transmit data with the master device at the same time.

In FIG. 2, an exemplary 4-port data transmission mode is shown. Under this mode, the port control parameter 205 is set to 4. Therefore, there are at most four slave devices that can be supported to concurrently transmit data with the master device. Each transmission line in the transmission buses MOSI[3:0] and MISO[3:0] as shown in FIG. 1 may be respectively coupled between the master and slave devices so as to transmit or receive the corresponding data bits (for example, as the data bits DO[0] to DO[n] and DI[0] to DI[n] shown in FIG. 1) to or from the corresponding slave devices. According to an embodiment of the invention, the master device may comprise a multi-level input shift register 105 and a multi-level output shift register 106 (as shown in FIG. 1) to buffer the data bits respectively received from each slave device and the data bits to be transmitted to each slave device. To be more specific, in the exemplary 4-port data transmission mode shown in FIG. 2, the master device may comprise a plurality of input shift registers 105-0 to 105-3 and a plurality of output shift registers 106-0 to 106-3. Each input shift register may respectively store the data bits received from a corresponding slave device (e.g. from one of the slave devices 102-0 to 102-$n$, where n=3 in this example), and each output shift register may respectively store the data bits to be transmitted to a corresponding slave device.

During the data transmission procedure in the multi-port data transmission mode, the data transmission selector 201 may process the data bits received from each slave device in parallel so as to dispatch the data bits to the corresponding input shift registers 105-0 to 105-3. The data transmission selector 201 may also process the data bits received from the output shift registers 106-0 to 106-3 in parallel so as to dispatch the data bits to the corresponding slave devices. Therefore, the input shift registers 105-0 to 105-3 may concurrently receive data from the corresponding slave devices (that is, respectively receive data from the corresponding slave devices at the same time), and the output shift registers 106-0 to 106-3 may concurrently output data to the corresponding slave devices (that is, respectively transmit data to the corresponding slave devices at the same time). In this manner, the master device may concurrently transmit data to each slave device via the transmission bus MOSI, and receive data from each slave device via the transmission bus MISO.

The transmission bit counter 202 may accumulate a number of data bits that have been transmitted within a transmission period to obtain an accumulation result. The accumulation result obtained by the transmission bit counter 202 may be further transmitted to the logic comparator 203. The logic comparator 203 compares the accumulation result with a transmission bit parameter 206 to obtain a bit comparison result, wherein the transmission bit parameter 206 may be determined according to depth of each input shift register and/or each output shift register; that is, the total number of bits that can be stored in each input shift register and/or each output shift register. For example, the depth of a shift register may be designed as 8 bits, 16 bits, 32 bits, or others. According to the SPI transmission protocol, the depth of a shift register may be designed according to the number of bits comprised in a packet. Therefore, the bit comparison result obtained by the logic comparator 203 may reveal whether a current packet transmission has been completed. For example, when the depth of the shift register is 8 bits, the transmission bit parameter 206 is set to 8, which means that there are 8 bits comprised in a packet. Therefore, when the accumulation result becomes 8, the logic comparator 203 may obtain the bit comparison result indicating that the current packet transmission has been completed by comparing the accumulation result with the transmission bit parameter 206.

The bit comparison result obtained by the logic comparator 203 may further be transmitted to the packet comparator 204. The packet comparator 204 compares the bit comparison result with a transmission packet parameter 207 to obtain a packet comparison result. The transmission packet parameter 207 represents a number of packets that have to be transmitted within a transmission period. For example, when the transmission packet parameter 207 is set to 1, it means that there is one packet needed to be transmitted within the transmission period. According to an embodiment of the invention, the transmission period may be a period of the chip select signal SPI_SS. Therefore, when the bit comparison result indicates that there is one packet that has completed transmission, the packet comparator 204 compares the bit comparison result with the transmission packet parameter 207 so as to obtain the packet comparison result indicating that data transmission in the current transmission period has already been completed. Note that the system parameters, such as the port control parameter 205, the transmission bit parameter 206 and the transmission packet parameter 207, may be stored in a memory configured inside of the system, and the setting of each parameter may be flexibly designed according to various system requirements and the transmission modes (the setting of the above-mentioned system parameters will be discussed in more detailed in the following paragraphs).

Figure 3:
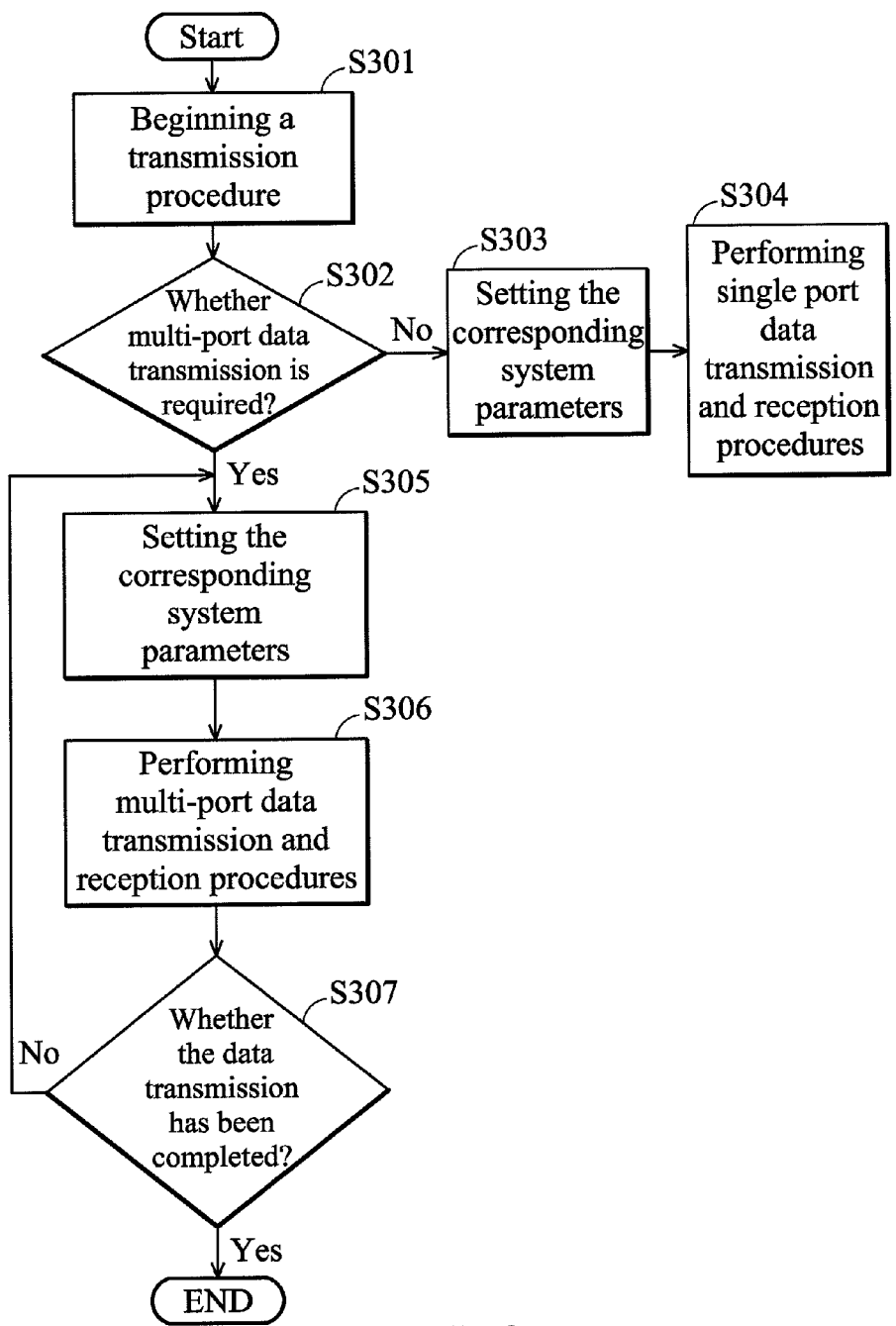
FIG. 3 is a flow chart showing the data transmission procedure in a data transmission system according to an embodiment of the invention.

FIG. 3 is a flow chart showing the data transmission procedure in a data transmission system according to an embodiment of the invention. After the transmission procedure begins (Step S301), the programmable controller determines whether multi-port data transmission is required according to the system requirement (Step S302). If not, the programmable controller may set the corresponding system parameters (for example, the port control parameter 205, transmission bit parameter 206 and transmission packet parameter 207 as previously described) (Step S303), and perform single port data transmission and reception (Step S304). On the other hand, if yes, the programmable controller may set the corresponding system parameters (Step S305), and perform multi-port data transmission and reception procedures (Step S306). Next, the programmable controller may further determine whether the data transmission has been completed (Step S307). As previously described, the programmable controller may determine whether there is any packet that has to be transmitted in the current data transmission. When there is no further packet that has to be transmitted, it means that the current data transmission has been finished. When there is still a packet that has to be transmitted, it means that the current data transmission has not been finished, and the programmable controller may further set the corresponding system parameters according to the system requirements (Step S305) and continue to perform multi-port data transmission and reception procedures (Step S306).

Figure 4A:
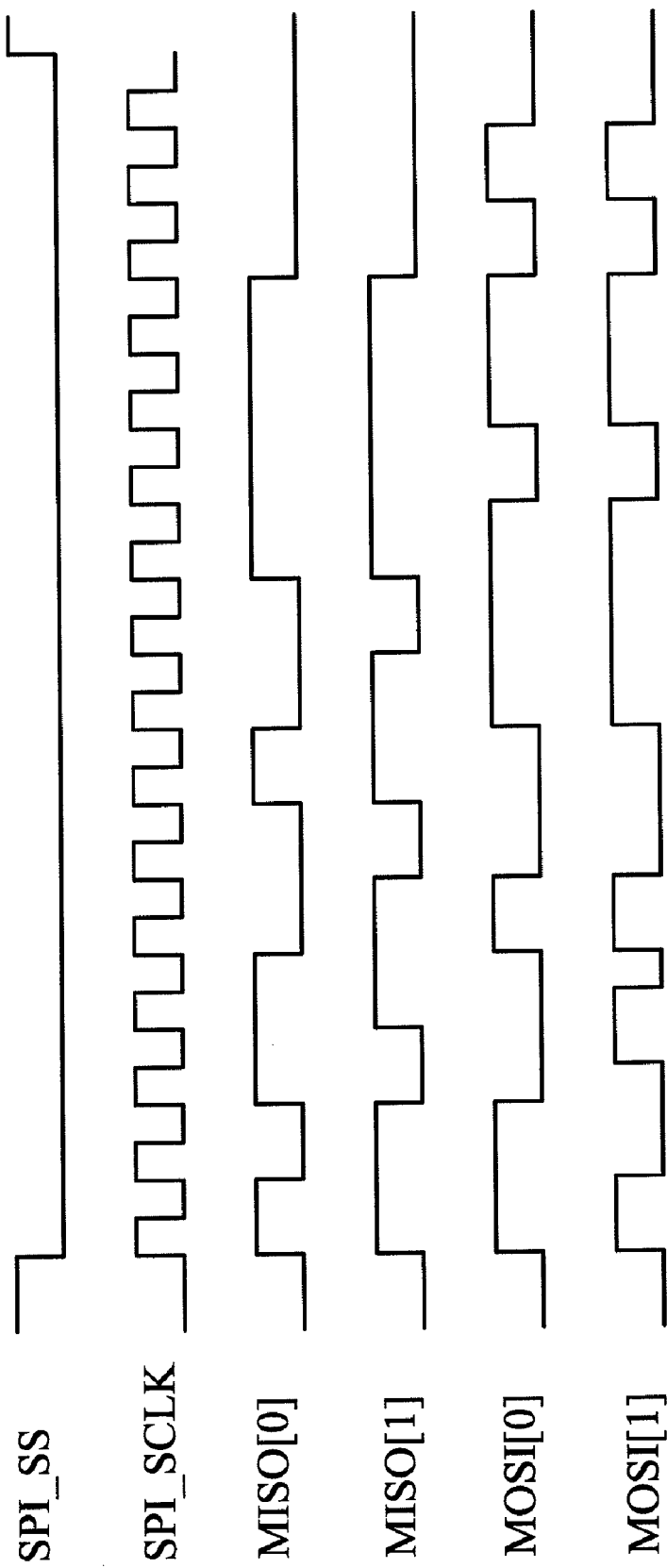
FIG. 4A and FIG. 4B show the signal waveforms of the signals in the data transmission system according to an embodiment of the invention.
Figure 4B:
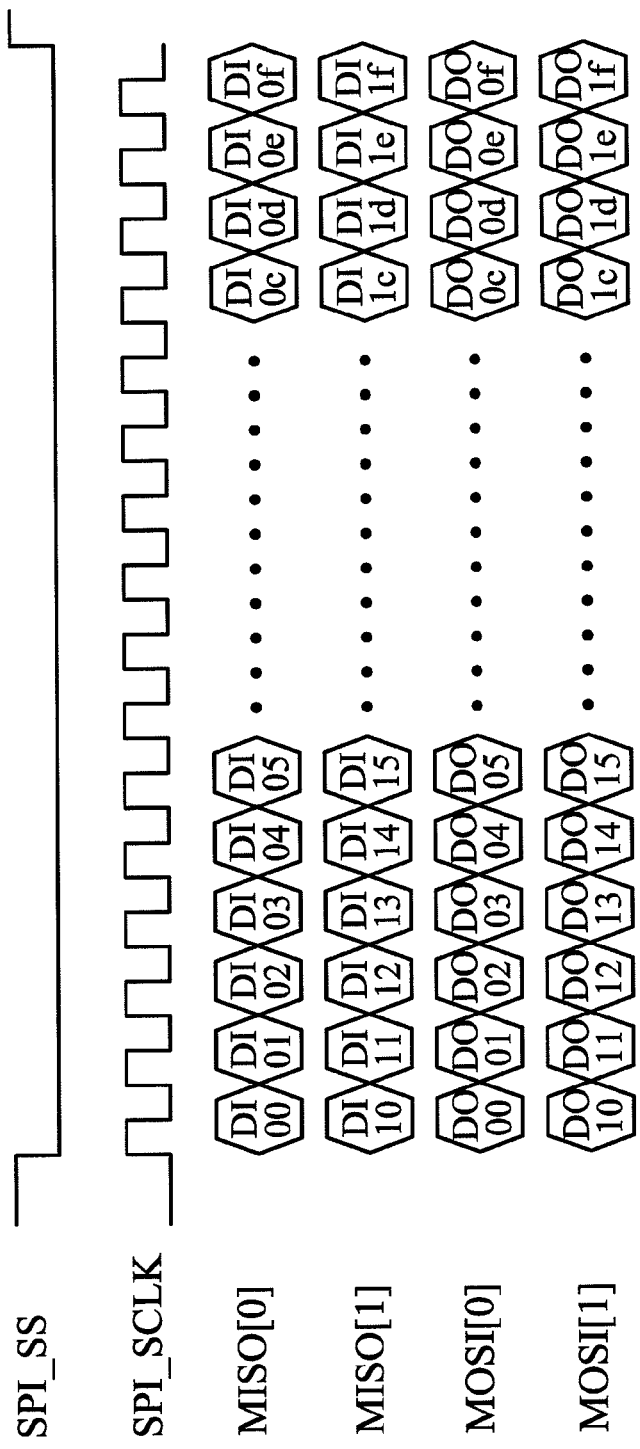

FIG. 4A and FIG. 4B show the signal waveforms of the signals in the data transmission system according to an embodiment of the invention, wherein a dual-port data transmission mode is introduced in the embodiment. According to an embodiment of the invention, the chip select signal SPI_SS may be designed as an active low control signal. Therefore, when the chip select signal SPI_SS transits from high to low, the data transmission between the master device and the slave devices is activated. A transmission period may be defined as the period beginning from the chip select signal SPI_SS being transited from a high to low level, to the chip select signal SPI_SS being pulled back to a high level. The signal waveforms within a transmission period are shown in FIG. 4A and FIG. 4B, where the difference between the signal waveforms shown in FIG. 4A and FIG. 4B is that the data content during transmission period is shown in FIG. 4A, while the data bits transmission order is shown in FIG. 4B.

As shown in FIG. 4A, the transmission buses MISO[0], MISO[1], MOSI [0] and MOSI[1] may be utilized concurrently for data bit transmission. Therefore, for a master device, two bits of data can be concurrently transmitted and received at the same time. FIG. 4B shows the order of data bits transmission more clearly, where each input data bit DI and output data bit DO may be encoded by two digits, as the DI nm and DO nm (n is a positive integer ranged from 0 to 1 and m is a positive integer ranging from 0 to f) shown in the figure. The first digit n represents the n-th transmission bus and the second digit m represents the m-th bit of data transmitted on the transmission bus. Therefore, DI 0f represents the 16-th input data bit transmitted on the 0-th transmission bus. As shown in the figure, the data bits are transmitted sequentially on the transmission bus and are stored into the corresponding shift registers (or transmitted sequentially from the shift registers to the corresponding transmission bus). Therefore, in the embodiments of the invention, the processor (not shown) in the data transmission system can directly access the data in the shift register (or transmit data to the corresponding shift register), so that an additional data bits reorder is not required.

As previously described, the programmable controller may control switching of the data transmission modes. According to an embodiment of the invention, the system parameters can be flexibly designed under both of the single port or multi-port data transmission modes so that various system requirements (for example, multi-bit and multi-packet data transmission or single-bit and multi-packet data transmission) can be fulfilled under a fixed hardware structure of the data transmission system. The setting of the system parameters in single port and multi-port data transmission modes are introduced in more detail in the following paragraphs.

Suppose that the maximum number of slave devices can be supported in a data transmission system to perform data transmission with the master device is 4, it means that there are at most 4 bits of data that can be input or output at the same time. Therefore, in the multi-port data transmission mode, the port control parameter 205 may be set to 2, 3 or 4. When the port control parameter 205 is set to 4, the master device may concurrently transmit data with the 4 slave devices coupled to the SPI in a full duplex manner. When the port control parameter 205 is set to 2 or 3, the master device may concurrently transmit data with the 2 or 3 slave devices coupled to the SPI in a full duplex manner. According to an embodiment of the invention, when the number of slave devices coupled to the SPI is less than the maximum number of slave devices which can be supported in data transmission system, the transmission buses MOSI and MISO that are not coupled to the slave devices may be configured as the General Purpose Input Output (GPIO) pins so that no data pins are wasted.

In the single port data transmission mode, the port control parameter 205 is set to 1 and the master device transmits data with one slave device coupled to the SPI in a full duplex manner. In order to improve the utilization of the multi-level input and output shift registers in the single port data transmission mode, the data transmission selector 201 may sequentially transmit data bits input by the corresponding slave device to each of the plurality of input shift registers, and sequentially transmit data bits stored in each of the plurality of output shift registers to the corresponding slave device. More specifically, referring to FIG. 2, in the single port data transmission mode, the port control parameter 205 is set to 1 and the transmission packet parameter 207 may be set from 1 to 4. When the transmission packet parameter 207 is set to 4, it means that there are 4 packets which have to be transmitted in a transmission period. Therefore, in the transmission period, the data transmission selector 201 may sequentially transmit data bits of each packet input by the corresponding slave device to each of the input shift registers 105-0, 105-1, 105-2 and 105-3, and sequentially transmit data bits of each packet stored in each of the output shift registers 106-0, 106-1, 106-2 and 106-3 to the corresponding slave device. Suppose that the depth of the shift register in the system is 16 bits, therefore, there are at most 16×4=64 bits of data which can be transmitted in a full duplex manner within a transmission period. Similar concepts may also be applied to the multi-port data transmission mode when the port control parameter 205 is set to a number less than the maximum number of slave devices which can concurrently transmit data with the master device (in this example, when the port control parameter 205 is set to 2 or 3). In this manner, even if the system is not utilized in the maximum supported number of ports of data transmission, all of the transmission buses MOSI and MISO and the input/output shift registers can still be efficiently used. Therefore, no data pins or shift registers are wasted.

Figure 5:
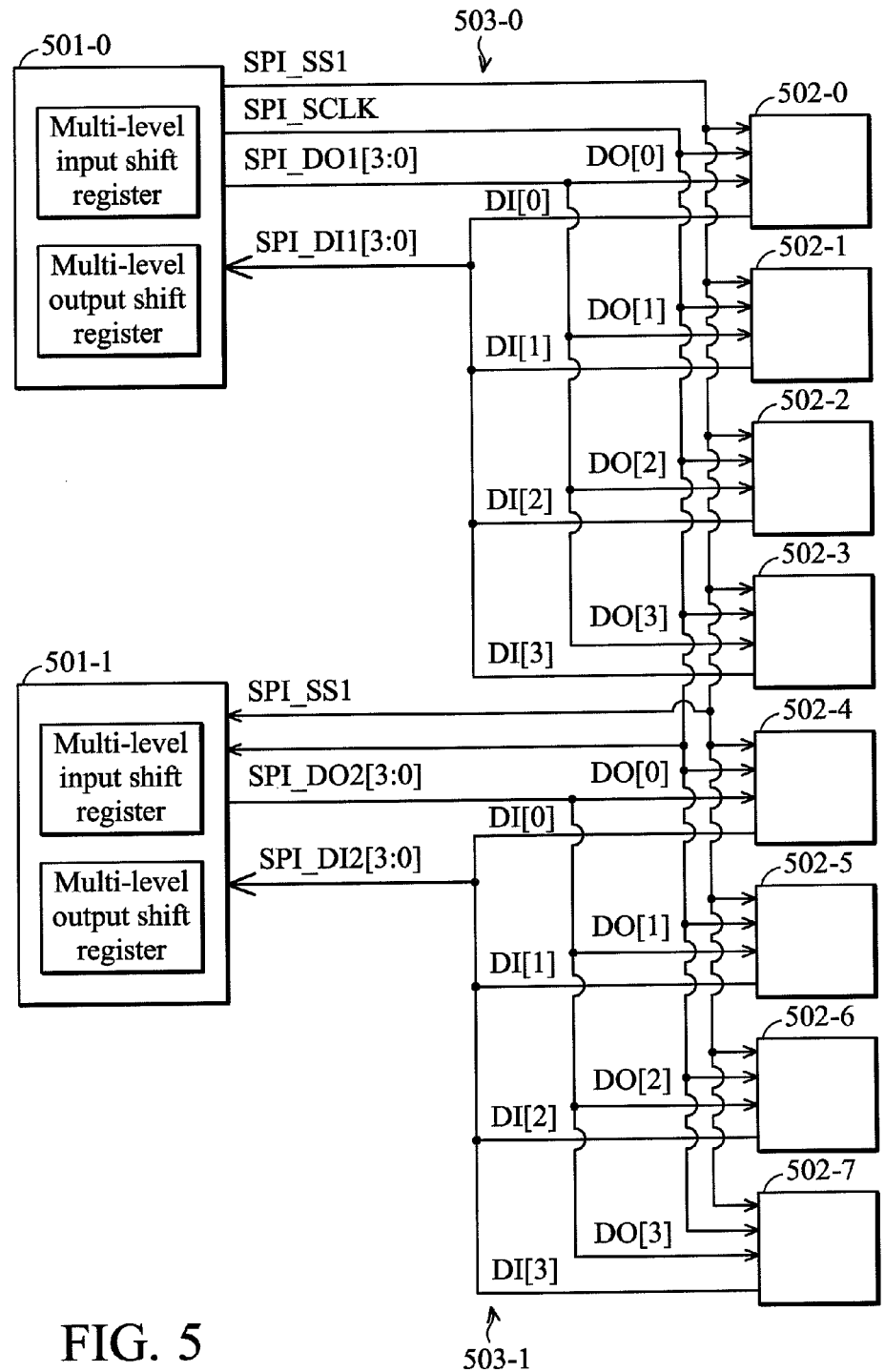
FIG. 5 shows a data transmission system according to another embodiment of the invention.

FIG. 5 shows a data transmission system 500 according to another embodiment of the invention. The data transmission system 500 comprises a plurality of data transmission devices 501-0 to 501-1 and 502-0 to 502-7, and the SPI 503-0 and 503-1 coupled therebetween, where the data transmission device 501-0 may be the master devices and the data transmission devices 501-1 and 502-0 to 502-7 may be the slave devices. In this embodiment, the clock signal SPI_SCLK provided by data transmission device 501-0 is shared between the data transmission devices 501-1 and 502-0 to 502-7. The master device 501-0 may select a first group of slave devices 502-0 to 502-3 and second group of slave devices 502-4 to 502-7 via the chip select signal SPI_SS1. The master device 501-0 transmits data bits SPI_DO1[3:0] to the slave devices 502-0 to 502-3 via the transmission buses, where the data bits DO[0], DO[1], DO[2] and DO[3] are transmitted to the corresponding slave devices 502-0 to 502-3, respectively. The master device 501-0 also receives data bits SPI_DI1[3:0] from the slave devices 502-0 to 502-3 via the transmission buses, where the data bits DI[0], DI[1], DI[2] and DI[3] are transmitted from the corresponding slave devices 502-0 to 502-3 to the master device 501-0, respectively. The data transmission device 501-1 received chip select signal SPI_SS1 as well, and can act as a slave device, similarly, data transmission device 501-1 transmits data bits SPI_DO2[3:0] to the slave devices 502-4 to 502-7 via the transmission buses, where the data bits DO[0], DO[1], DO[2] and DO[3] are transmitted to the corresponding slave devices 502-4 to 502-7, respectively. The data transmission device 501-1 also receives data bits SPI_DI2[3:0] from the slave devices 502-4 to 502-7 via the transmission buses, where the data bits DI[0], DI[1], DI[2] and DI[3] are transmitted from the corresponding slave devices 502-4 to 502-7 to the data transmission device 501-1, respectively.

Reference may be made to FIG. 1 its corresponding paragraphs concerning the method for handling data transmission in the data transmission system 500; thus descriptions are omitted here for brevity. As shown in FIG. 1, FIG. 2 and FIG. 5, the elements and data transmission devices in the data transmission system may be flexibly configured, and a maximum number of bits that can be transmitted in the data transmission system may also be flexibly designed in accordance with different system requirements. Therefore, while the invention has been described by way of example and in terms of embodiment, it is to be understood that the invention is not limited thereto. In addition, the proposed data transmission system can not only keep the data transmission functionality of the original four wired SPIs, but also provide the functionality of concurrently reading or writing multi-bits of data via the SPI by setting the system parameters (for example, the port control parameter 205, transmission bit parameter 206 and transmission packet parameter 207 as previously described) and dispatching the input and output data adequately to each multi-level shift register. Therefore, the value of the SPI is further improved.

While the invention has been described by way of example and in terms of embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data transmission system, comprising:
   a serial peripheral interface (SPI), coupled between a first device and at least one second device, comprising:
   a serial clock terminal, transmitting a clock signal between the first device and the at least one second device;
   a chip select terminal, transmitting a chip select signal between the first device and the at least one second device so as to activate data transmission therebetween;
   a first transmission bus terminal, transmitting data from the first device to the at least one second device; and
   a second transmission bus terminal, transmitting data from the at least one second device to the first device; and
   a programmable controller, controlling the SPI to switch between a single port data transmission mode and a multi-port data transmission mode,
   wherein when there are more than one second device coupled to the SPI, the SPI is switched to the multi-port data transmission mode so as to perform multi-port data transmission between the first device and the second devices, and the first device concurrently transmits data to each of the second devices via the first transmission bus terminal, and concurrently receives data from each of the second devices via the second transmission bus terminal.

2. The data transmission system as claimed in claim 1, wherein the programmable controller is integrated inside of the first device, at least one of the second devices or the SPI.

3. The data transmission system as claimed in claim 2, further comprising a plurality of input shift registers and a plurality of output shift registers, configured inside of the first device, wherein when the SPI is switched to the multi-port data transmission mode, the plurality of input shift registers concurrently receive data from the second devices, and the plurality of output shift registers concurrently output data to the second devices.

4. The data transmission system as claimed in claim 3, wherein the programmable controller comprises:
a data transmission selector, dispatching data according to a port control parameter, wherein the port control parameter represents a number of the at least one second device that concurrently transmit data with the first device.

5. The data transmission system as claimed in claim 4, wherein in the multi-port data transmission mode, the data transmission selector concurrently transmits data bits input by each second device to a corresponding input shift register, and concurrently transmits data bits stored in the output shift registers to a corresponding second device.

6. The data transmission system as claimed in claim 4, wherein in the single port data transmission mode, the data transmission selector sequentially transmits data bits input by the corresponding second device to the plurality of input shift registers, and sequentially transmits data bits stored in the plurality of output shift registers to the corresponding second device.

7. The data transmission system as claimed in claim 4, wherein the programmable controller further comprises:
a transmission bit counter, accumulating a number of data bits that have been transmitted within a transmission period to obtain an accumulation result;
a logic comparator, comparing the accumulation result with a transmission bit parameter to obtain a bit comparison result, wherein the transmission bit parameter is determined according to a depth of each input shift register and/or each output shift register; and
a packet comparator, comparing the bit comparison result with a transmission packet parameter to obtain a packet comparison result, wherein the transmission packet parameter represents a number of packets that have to be transmitted within the transmission period, and a total number of bits comprised in each packet is determined according to the transmission bit parameter.

8. The data transmission system as claimed in claim 7, wherein the transmission period is a period of the chip select signal.

9. A data transmission system, comprising:
a serial peripheral interface (SPI), coupled to a first device, comprising:
a serial clock terminal, transmitting a clock signal to at least one second device;
a chip select terminal, transmitting a chip select signal so as to activate data transmission;
a first transmission bus terminal, transmitting data to the at least one second device; and
a second transmission bus terminal, receiving data from the at least one second device; and
a programmable controller, controlling the SPI to switch between a single port data transmission mode and a multi-port data transmission mode,
wherein when there are more than one second device coupled to the SPI, the SPI is switched to the multi-port data transmission mode so as to perform multi-port data transmission between the first device and the second devices, and the first device concurrently transmits data to each of the second devices via the first transmission bus terminal, and concurrently receives data from each of the second devices via the second transmission bus terminal.

10. A programmable serial peripheral interface (SPI) controller for controlling a data transmission mode of an SPI, comprising:
a data transmission selector, dispatching data according to a port control parameter,
wherein the port control parameter represents a number of at least one second device that concurrently transmit data with a first device, the data transmission mode is switched between a single port data transmission mode and a multi-port data transmission mode, the first device and the at least one second device transmit data bits via the SPI, when there are more than one second device coupled to the SPI, and the SPI is switched to the multi-port data transmission mode so as to perform multi-port data transmission between the first device and the second devices, and the first device concurrently transmits data to each of the second devices via a first transmission bus terminal, and concurrently receives data from each of the second devices via a second transmission bus terminal.

11. The programmable SPI controller as claimed in claim 10, wherein the programmable controller is integrated inside of the first device, the at least one of the second devices or the SPI.

12. The programmable SPI controller as claimed in claim 10, when the SPI is switched to the multi-port data transmission mode, the data transmission selector controls a plurality of input shift registers in the first device to concurrently receive data from each of the second devices, and controls a plurality of output shift registers in the first device to concurrently output data to each of the second devices.

13. The programmable SPI controller as claimed in claim 12, further comprising:
a transmission bit counter, accumulating a number of data bits that have been transmitted within a transmission period to obtain an accumulation result; and
a logic comparator, comparing the accumulation result with a transmission bit parameter to obtain a bit comparison result, wherein the transmission bit parameter is determined according to a depth of each input shift register and/or each output shift register.

14. The programmable SPI controller as claimed in claim 13, further comprising:
a packet comparator, comparing the bit comparison result with a transmission packet parameter to obtain a packet comparison result, wherein the transmission packet parameter represents a number of packets that have to be transmitted within the transmission period, and a total number of bits comprised in each packet is determined according to the transmission bit parameter.

15. The programmable SPI controller as claimed in claim 12, wherein when a setting of the port control parameter equals to a maximum number of the second devices that are capable of concurrently transmitting data with the first device, the data transmission selector concurrently transmits the data bits input by each second device to a corresponding input shift register, and concurrently transmits the data bits stored in the output shift registers to a corresponding second device.

16. The programmable SPI controller as claimed in claim 12, wherein when a setting of the port control parameter is less than a maximum number of the second devices that are capable of concurrently transmitting data with the first device, the data transmission selector sequentially transmits data bits input by the corresponding second device(s) to the plurality of input shift registers, and sequentially transmits the data bits stored in the plurality of output shift registers to the corresponding second device(s).

* * * * *